United States Patent [19]

Chorosevic

[11] 4,300,803
[45] Nov. 17, 1981

[54] ADHESIVE VEHICLE WHEEL WEIGHT AND METHOD

[75] Inventor: Jerome J. Chorosevic, Bristol, Va.

[73] Assignee: Plumbium Manufacturing Corporation, Bristol, Tenn.

[21] Appl. No.: 75,666

[22] Filed: Sep. 14, 1979

[51] Int. Cl.$^3$ .............................................. B60B 13/00
[52] U.S. Cl. .................................... 301/5 B; 73/470; 74/573 R
[58] Field of Search .......................... 301/5 B, 41 W; 74/573 R; 73/469, 470; 16/1 C, DIG. 8

[56] References Cited

U.S. PATENT DOCUMENTS

| | | | |
|---|---|---|---|
| 2,029,132 | 1/1936 | Skelton | 301/5 B |
| 2,576,724 | 11/1951 | Pouell | 301/5 B |
| 3,177,039 | 4/1965 | Skidmore | 301/5 B |
| 3,273,941 | 9/1966 | Skidmore | 301/5 B |

FOREIGN PATENT DOCUMENTS 911275  11/1962  United Kingdom ................ 301/5 B

*Primary Examiner*—H. Grant Skaggs
*Attorney, Agent, or Firm*—Francis A. Keegan

[57] ABSTRACT

An adhesively secured balance weight for counterbalancing vehicle wheels possessing a rim flange and a protruding lip to receive the weight composed of a body having a mass of heavy metal and a length greater than the width and thickness. The body includes top and rear surfaces in which the rear surface is substantially planar for receiving an adhesive layer to adhere the weight to the rim flange. The top surface of the body is provided with an abutment surface for contact with the protruding lip and a chamfer is formed between the top and rear surface by a removal at the arris of about 0.05-0.3 inches on each surface to form a chamfer at least 0.05 times the thickness of the weight. A layer of adhesive is positioned on the rear surface of the weight to secure the weight to the rim flange.

A method for counterbalancing vehicle wheels with the rim flange and a protruding lip by determining with a conventional balancer the proper mass of the weight and the proper balancing location for the wheel which additionally includes selecting the adhesive backed wheel weight with a top abutment surface and a rear surface having an adhesive layer and a chamfer between the surfaces. The weight is positioned on the rim flange by inserting the weight with the chamfer facing between the rim flange and the protruding lip. In this position, there is formed an abutting contact between the protruding lip and the top abutment surface to prevent the dislodging of the weight. Thereafter the adhesive on the wheel weight is pressed against the rim flange to secure the rim flange and counterbalance the vehicle wheel.

16 Claims, 4 Drawing Figures

ADHESIVE VEHICLE WHEEL WEIGHT AND METHOD

BACKGROUND OF THE INVENTION

1. Field of the Invention

This invention relates to the field of balancing vehicle wheels and more particularly to a wheel balance weight and method for facilitating the balancing of vehicle wheels when using the electronic balancers that indicate the proper weight to be applied and the location on the wheel to properly counterbalance the wheel.

2. Description of the Prior Art

Adhesive backed weights are known to those skilled in the art and have been disclosed for instance in U.S. Pat. Nos. 3,177,039 and 3,273,941. However in each instance the weight cannot be applied at the flange of the rim where a conventional clip-on weight is attached because it has been found that they have a tendency to dislodge during operation of the vehicle or cannot be applied in the first instance. These adhesive backed weights heretofore had to be secured on a radially inner surface of the rim where the centrifugal force maintains the weight in contact with the rim.

The adhesive backed weights of the prior art were never shaped in a manner that would permit such weights to be located in the rim flange in contact with the protruding lip. The typical adhesive backed weight was designed simply to be adherent to a radially inner surface on the wheel and not to be positioned on the rim flange adjacent the protruding lip. Such location requirements however are not easily met with the variety of wheels having radial surfaces at differing locations from the rotational axis of the wheel.

The problem is particularly acute when utilizing the conventional electronic balancers of the prior art. Present electronic balancers indicate the amount of the weight to be applied and the angular location to position the weight on the wheel rim flange rather than any radially inner surface of the wheel.

The angular location indication as well as the weight indicated by the balancer do not take into consideration that the adhesive weights must be applied to the radially inner surface. Since the radially inner surface is at a radial distance from the center of the wheel considerably less than the distance to the rim wheel flange, the magnitude of the correcting weight is sure to be incorrect unless the operator has made some mental adjustment. It is likely, then, that large errors will occur in the correction process and that further spins of the electronic balancer will be required. On subsequent spins of the electronic balancer, similar errors will occur and a similar cut-and-try process will take place.

OBJECTS OF THE INVENTION

It is the principal object of the present invention to provide an adhesive backed weight and a method that facilitates the use of electronic balancers and permits the utilization of wheels having the rim flange and projecting lip.

It is a further object of the present invention to provide an adhesive backed weight capable of being securely positioned on the rim flange of a vehicle wheel and utilize the projecting lip of the wheel flange to abut the top surface of the weight in order to prevent the weight from being dislodged.

It is also one of the important objects of the present invention to avoid the errors and the time-wasting cut-and-try process through a wheel weight designed to be applied to the wheel rim flange, at the very point at which the electronic balancer is designed to indicate magnitude and angular location of correction.

SUMMARY OF THE INVENTION

The balance weight of the present invention is provided with an adhesive backing for counterbalancing vehicle wheels possessing a rim flange and a protruding lip. The weight is composed of a body having a heavy mass and a length greater than the width and thickness. Included on the body are a substantially flat top surface and a planar rear surface with an adhesive layer positioned on the rear surface. The top surface of the body is provided with an abutment surface to contact the protruding lip on the wheel flange in order to retain the balance weight in position.

In the method of counterbalancing vehicle wheels with a rim flange and protruding lip the present invention begins with the known values of both the magnitude of the counterbalancing weight and the angular locations for the weight to be imposed on the inside and outside rim of the vehicle wheel. The wheel weight is placed with the adhesive backed side against the rim flange with the chamfer facing the intersection of the protruding lip and the rim flange and the abutment surface on the top surface of the weight in contact with the protruding lip.

THE DRAWINGS

DETAILED DESCRIPTION OF THE INVENTION

Figure 1:
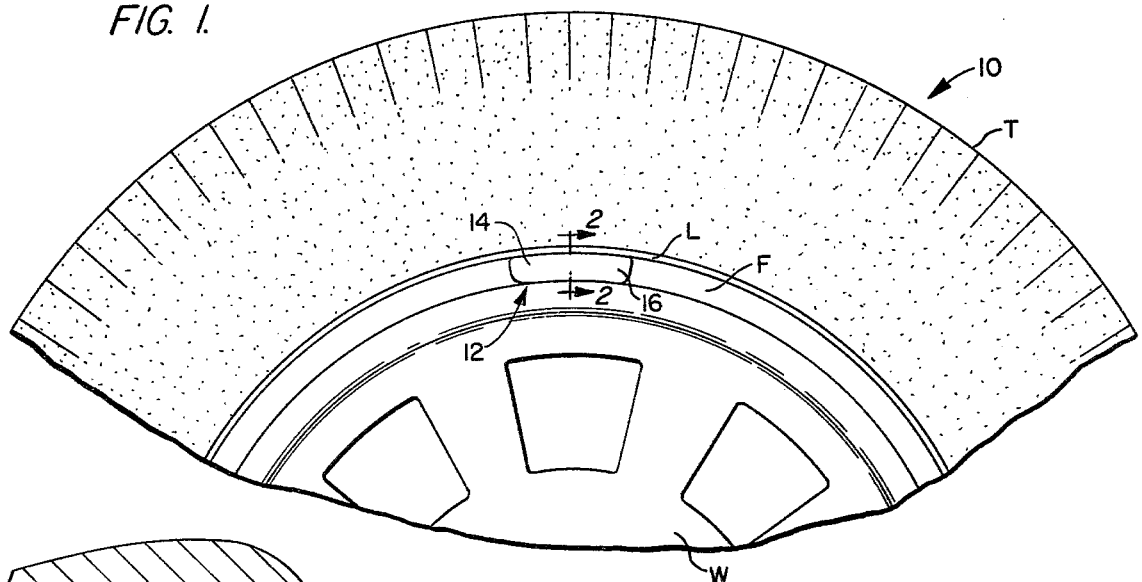
FIG. 1 is a plan view of the wheel assembly of the present invention illustrating the adhesively secured balance weight in position on the rim flange and in abutting contact with the protruding lip.

FIG. 1 illustrates a vehicle wheel assembly 10 comprising the tire T and the wheel W. The wheel W is provided with a rim flange F and a projecting lip L formed typically with a fillet E at the cross-section of the projecting lip L and the rim flange F. The projecting lip L is typically provided with a surface S concentric to the axis of rotation of the wheel assembly and extending at right angles to the surface of the rim flange F.

With a wheel of this configuration, which is typical of the wheels produced by the original equipment manufacturers and custom wheel producers today, the present invention breathes life and usefulness into adhesive weights when designed in accordance with the following description.

Figure 2:
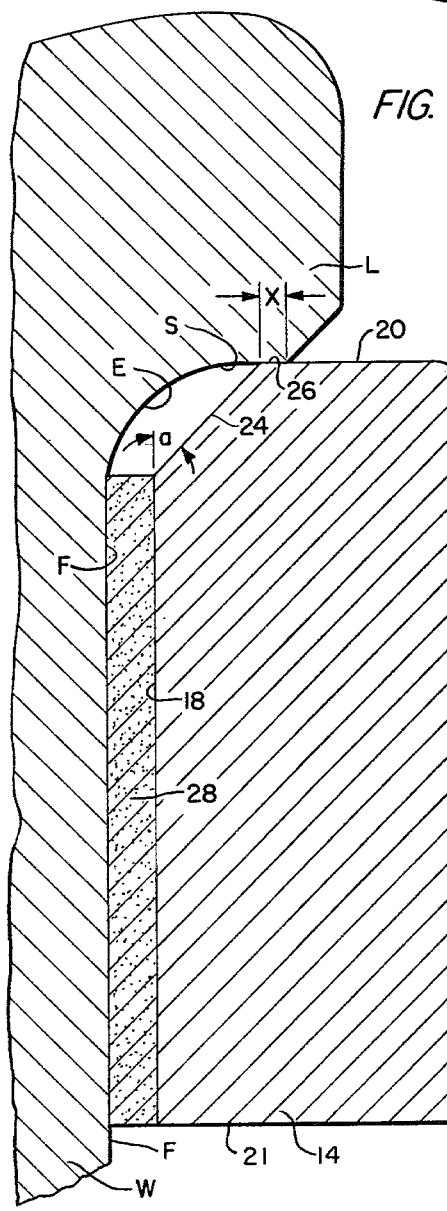
FIG. 2 is an enlarged cross-sectional view taken along lines 2—2 of FIG. 1 illustrating the positioning of the adhesively secured balance weight and the abutting contact between the abutment surface on the top surface of the weight and the protruding lip.
Figure 3:
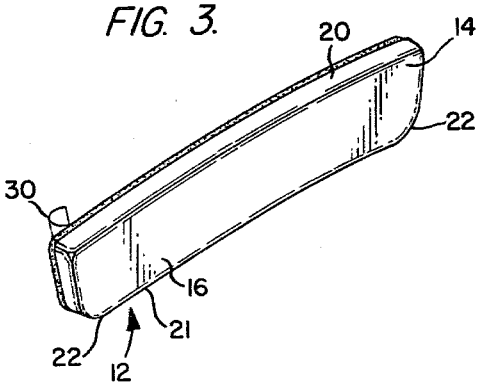
FIG. 3 is a perspective view of the vehicle wheel weight of the present invention.

The wheel balance weight for the present invention is best shown in FIGS. 2 and 3 at 12 and comprises a mass of heavy metal typically lead or lead alloy, steel or the like, shaped to have an elongated body 14, a length typically greater than the width and a width typically greater than the thickness although these proportions are not critical. The body is provided with a substantially planar front face 16 and a substantially planar rear surface 18. The top surface 20 of the weight is essentially flat but may be curved slightly so that the top surface 20 is slightly convex. A bottom surface 21 may have a slightly concave surface. The bottom corners of the wheel weight 12 may be rounded as shown at 22 which is preferable to prevent the wheel weight from snagging and possibly being ripped off during vehicle operation. This rounding is not, however, a critical feature of the present invention.

One of the important aspects of the present invention is the chamfer surface 24 as best shown in FIG. 2. The chamfer is formed between the top surface 20 and the rear surface 18 by removal at the arris of approximately 0.05–0.3 inches of each surface preferably removing 0.06–0.09 inches and more preferably approximately 0.07 inches. The angle "a" shown in FIG. 2 that the chamfer surface 24 preferably makes with the rear surface 18 extended is most preferably about 45° but may be extended to an angle between 40° and 50° and more broadly it is possible that the angle "a" may be between 30° and 60°.

The chamfer surface 24 formed by removing a portion of the top surface 20 leaves a top abutment surface 26 which is shown by the dimension x and should be at least 0.05 times the thickness of the weight as measured from the rear surface 18 to the front surface 16. The top abutment surface 26 of a dimension x is the measure from the intersection with the chamfer surface 24 and the top surface 20 and extends for as long as the surface of the protruding lip L is in contact with the top surface 20. As shown in FIG. 2 this mutual abutting contact is of the length as shown by x. The top abutment surface should be at least 0.01 inches to prevent accidental and unintentional dislodgement of the wheel weight from the flange.

Positioned on the rear surface 18 of the wheel weight of the present invention is a layer of adhesive 28 which may be any one of the conventional adhesives that have been used for securing wheel weights in the past. The adhesive preferably though not necessarily will extend throughout the entire rear surface to enable the weight to be secured to the wheel flange F. A conventional peelable film strip 30 is shown in FIG. 3 to protect the adhesive layer prior to positioning the wheel weight on the rim flange.

Figure 4:
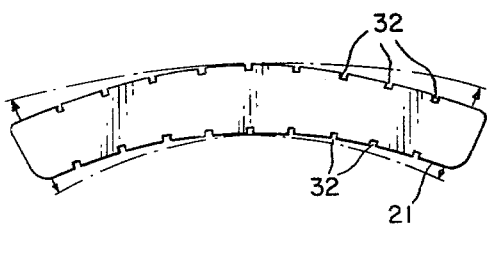
FIG. 4 is a plan view of a modification to the weights of FIGS. 1 through 3 illustrating that the wheel weight may be bent to conform to the circular configuration of the rim flange.

In FIG. 4 the optional modification shows a plurality of grooves 32 provided in the top surface 20 and bottom surface 21 of the wheel weight in order to permit the weight to be bent as shown in FIG. 4 to more easily conform to the rim flanges of a smaller radius.

In the operation of the present invention and the use of the weights the conventional electronic balancer provides a readout of the magnitudes of the weights to the applied on both the inner and outer wheel rims. Each of these weights is also indicated by the balancer to be applied at a certain angular location. Experience has demonstrated that the operators are not very adept at placing the weight in the correct location or in the past with finding the radially inner surface.

The magnitude of the weight 12 to be applied is selected in accordance with the indicated magnitude of the weight on the electronic balancer and, according to the sizes available, usually in ½, 1, 1½, 2, 2½, and 3 ounce sizes. The selection of the weight 12 is made as close to the indicated weight as possible.

The weight 12 is applied so that the chamfer surface 24 is applied facing the fillet E between the protruding lip and the rim flange so that the abutting surface contact 26 is at distance x of 0.01 inches minimum. This would be true for a weight of an overall width of 0.500 inches and a thickness not including the adhesive layer of 0.200 inches. The chamfer surface 24 is a 0.071 inch by 45° chamfer and enables the weight 12 to fit closely on the rim flange F and be held in place by the adhesive layer 28 and the protruding lip L.

With the foregoing description it is believed that the objects of the invention have been met and that the scope of the invention should be limited solely by the appended claims.

I claim:

1. An adhesively secured balance weight for counterbalancing vehicle wheels positioned on an axis of rotation and having a rim flange with a protruding lip comprising, a mass of a heavy metal having a body for positioning on said flange, said body having top and rear surfaces, said rear surface of said body being a substantially planar surface for receiving an adhesive layer thereon, said top surface of said body having an abutment surface for contact with said protruding lip, a chamfer formed between the top and the rear surface by a removal at the arris formed from each surface, said top abutment surface extending from the end of the chamfer surface to form abutment direct surface to surface contact between the protruding lip and top abutment surface along a sufficient length substantially concentric with and substantially parallel to said axis of rotation, a layer of adhesive positioned on the rear surface for securing the weight to the rim flange to abut the protruding lip with at least a portion of the top surface whereby said weight is held in place without any movement relative to said wheel solely by both the adhesive and said abutment direct surface to surface contact of said top abutment surface with said protruding lip.

2. The weight of claim 1 including, said chamfer having an included angle of between 30° and 60°.

3. The weight of claim 1 or 2 including, said chamfer forming a planar surface of 0.05–0.3 inches.

4. The weight of claim 1 including, said chamfer having an included angle of between 40° and 50°.

5. The weight of claim 1 including, said chamfer forming a planar surface of 0.06–0.09 inches and having an included angle of between 40° and 50°.

6. The weight of claim 1 including, said adhesive layer having a peelable strip for removal prior to securing the weight to the wheel.

7. The weight of claim 1 including, said weight being rounded along the length thereof to conform to the radius of the wheel rim.

8. The weight of claim 1 including, a plurality of grooves transverse to the longitudinal length of the weight being provided in the top surface and a bottom surface of the weight to permit the weight to be conformed to the curvature of the rim.

9. A balanced vehicle wheel assembly comprising, a vehicle wheel having a tire mounted thereon and having an axis of rotation, said vehicle wheel having a rim flange substantially parallel to the plane of rotation of said wheel, said rim flange having a protruding lip extending substantially perpendicularly to the plane of said rim flange, a mass of a heavy metal having a body positioned on said flange, said body having a length greater than the width and thickness and including top and rear surfaces, said rear surface of said body being a substantially planar surface for receiving an adhesive layer thereon, said top surface of said body having an abutment surface for contact with said protruding lip, a chamfer formed between the top and the rear surface by a removal at the arris formed from each surface, said top abutment surface extending from the end of the chamfer surface to form abutment direct surface to surface contact between the protruding lip and top abutment surface along a sufficient length substantially concentric with and substantially parallel to said axis of rotation, a layer of adhesive positioned on the rear surface for securing the weight to the rim flange to abut the protruding lip with at least a portion of the top surface whereby said weight is held in place without any movement relative to said wheel solely by both the adhesive and said abutment direct surface to surface contact of said top abutment surface with said protruding lip.

10. The assembly of claim 9 including, said chamfer having an included angle of between 30° and 60°.

11. The assembly of claim 9 or 10 including, said chamfer forming a planar surface of 0.06–0.09 inches.

12. The assembly of claim 9 including, said chamfer having an included angle of between 40° and 50°.

13. The assembly of claim 9 including, said chamfer forming a planar surface of 0.06–0.09 inches and having an included angle of between 40° and 50°.

14. The assembly of claim 9 including, said adhesive layer having a peelable strip for removal prior to securing the weight to the wheel.

15. The assembly of claim 9 including, a plurality of grooves transverse to the longitudinal length of the weight being provided in the top surface and a bottom surface of the weight to permit the weight to be conformed to the curvature of the rim.

16. In a method for counterbalancing vehicle wheels having an axis of rotation having a rim flange with a protruding lip by determining with a conventional balancer the proper mass of the weight and the proper balancing location on the wheel the improvement comprising, selecting an adhesive backed wheel weight having a top abutment surface, a rear surface having an adhesive and a chamfer formed by removal of the arris between the surfaces, positioning said weight onto said rim flange by inserting said chamfer between said rim flange and said protruding lip, forming an abutting direct surface to surface contact between the protruding lip and the top abutment surface along a sufficient length substantially concentric with and substantially parallel to said axis of rotation to prevent dislodging the weight, and pressing said adhesive on said wheel weight against the rim flange to secure said weight to said rim flange and counterbalance the vehicle wheel whereby said weight is held in place without any movement relative to said wheel solely by both the adhesive and said abutment direct surface to surface contact of said top abutment surface with said protruding lip.

* * * * *